United States Patent
Reichman et al.

(10) Patent No.: US 7,700,071 B2
(45) Date of Patent: Apr. 20, 2010

(54) PRODUCTION OF HYDROGEN VIA A BASE-FACILITATED REACTION OF CARBON MONOXIDE

(75) Inventors: Benjamin Reichman, West Bloomfield, MI (US); William Mays, Commerce, MI (US); James Strebe, Clawson, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 1376 days.

(21) Appl. No.: 11/079,610

(22) Filed: Mar. 14, 2005

(65) Prior Publication Data

US 2005/0163706 A1 Jul. 28, 2005

Related U.S. Application Data

(63) Continuation-in-part of application No. 10/763,616, filed on Jan. 23, 2004, now Pat. No. 7,481,992.

(51) Int. Cl.
*C01B 3/08* (2006.01)

(52) U.S. Cl. .................. 423/657; 423/655; 205/482; 205/538; 205/637

(58) Field of Classification Search .............. 423/644, 423/648.1, 645, 646, 647; 205/464, 480, 205/482, 538

See application file for complete search history.

(56) References Cited

U.S. PATENT DOCUMENTS 3,928,435 A * 12/1975 Awane et al. ............... 562/609
4,226,845 A * 10/1980 Laine ......................... 423/655
4,338,096 A * 7/1982 Mayes ........................ 436/55
4,756,979 A * 7/1988 Specht ........................ 429/15
5,658,449 A * 8/1997 Benz et al. .................. 205/637
5,822,220 A * 10/1998 Baines ........................ 700/266
5,958,281 A * 9/1999 Takada et al. ............... 429/305
5,965,103 A * 10/1999 Golley et al. ................ 423/640

OTHER PUBLICATIONS

Jacobson, C.A. "Encyclopedia of Chemical Reactions.", Reinhold Publishing Corporation, 1948.*
Boswell, et al. "The Action of Sodium Hydroxide on Carbon Monoxide, Sodium Formate and Sodium Oxalate", J. Am. Chem. Soc., 1918, 40 (12), pp. 1779-1786.*

* cited by examiner

*Primary Examiner*—Stanley Silverman
*Assistant Examiner*—Paul Wartalowicz
(74) *Attorney, Agent, or Firm*—David W. Schumaker

(57) ABSTRACT

A method of producing hydrogen gas from a reaction of carbon monoxide with a base. Hydrogen is produced in a reaction of a base with carbon monoxide that proceeds through the formation of a bicarbonate or carbonate compound as a by-product. In some embodiments, the reaction may occur in the presence of water and may produce carbon dioxide as a by-product. The instant base-facilitated hydrogen-producing reactions are thermodynamically more spontaneous than the water-gas shift reaction and are able to produce hydrogen gas from carbon monoxide at greater reaction rates than is possible with the water-gas shift reaction. Carbon monoxide in a purified or unpurified state or as a component within a mixture of gases is suitable for use in the instant invention. Metal hydroxides are the preferred base reactant. The base reactant can be in the solid phase, molten phase, liquid phase or solution phase.

22 Claims, 1 Drawing Sheet

PRODUCTION OF HYDROGEN VIA A BASE-FACILITATED REACTION OF CARBON MONOXIDE

CROSS-REFERENCE TO RELATED APPLICATIONS

This application is a continuation-in-part of application Ser. No. 10/763,616, entitled "Base-Facilitated Reformation Reactions of Organic Substances", filed Jan. 23, 2004 now U.S. Pat. No. 7,481,992, and published as U.S. Pat. Appl. Pub. No. US2004/0156777 A1, the disclosure of which is herein incorporated by reference.

FIELD OF INVENTION

This invention relates to processes for forming hydrogen gas. More particularly, this invention relates to the production of hydrogen gas from oxidizable substances through chemical reactions under alkaline conditions. Most particularly, the instant invention relates to the production of hydrogen gas through reactions of carbon monoxide with a base.

BACKGROUND OF THE INVENTION

Modern societies are critically dependent on energy derived from fossil fuels to maintain their standard of living. As more societies modernize and existing modern societies expand, the consumption of fossil fuels continues to increase and the growing dependence worldwide on the use of fossil fuels is leading to a number of problems. First, fossil fuels are a finite resource and concern is growing that fossil fuels will become fully depleted in the foreseeable future. Scarcity raises the possibility that escalating costs could destabilize economies as well as the likelihood that nations will go to war over the remaining reserves. Second, fossil fuels are highly polluting. The greater combustion of fossil fuels has prompted recognition of global warming and the dangers it poses to the stability of the earth's ecosystem. In addition to greenhouse gases, the combustion of fossil fuels produces soot and other pollutants that are injurious to humans and animals. In order to prevent the increasingly deleterious effects of fossil fuels, new energy sources are needed.

The desired attributes of a new fuel or energy source include low cost, plentiful supply, renewability, safety, and environmental compatibility. Hydrogen is currently a promising prospect for providing these attributes and offers the potential to greatly reduce our dependence on conventional fossil fuels. Hydrogen is the most ubiquitous element in the universe and, if its potential can be realized, offers an inexhaustible fuel source to meet the increasing energy demands of the world. Hydrogen is available from a variety of sources including natural gas, hydrocarbons in general, organic materials, inorganic hydrides and water. These sources are geographically well distributed around the world and accessible to most of the world's population without the need to import. In addition to being plentiful and widely available, hydrogen is also a clean fuel source. Combustion of hydrogen produces water as a by-product. Utilization of hydrogen as a fuel source thus avoids the unwanted generation of the carbon and nitrogen based greenhouse gases that are responsible for global warming as well as the unwanted production of soot and other carbon based pollutants in industrial manufacturing.

The realization of hydrogen as a ubiquitous source of energy ultimately depends on its economic feasibility. Economically viable methods for producing hydrogen as well as efficient means for storing, transferring, and consuming hydrogen, are needed. Chemical and electrochemical methods have been proposed for the production of hydrogen. The most readily available chemical feedstocks for hydrogen are organic compounds, primarily hydrocarbons and oxygenated hydrocarbons. Common methods for obtaining hydrogen from hydrocarbons and oxygenated hydrocarbons are dehydrogenation reactions and oxidation reactions.

Steam reformation and the electrochemical generation of hydrogen from water through electrolysis are two common strategies currently used for producing hydrogen. Both strategies, however, suffer from drawbacks that limit their practical application and/or cost effectiveness. Steam reformation reactions are endothermic at room temperature and generally require temperatures of several hundred degrees to achieve acceptable reaction rates. These temperatures are costly to provide, impose special requirements on the materials used to construct the reactors, and limit the range of applications. Steam reformation reactions also occur in the gas phase, which means that hydrogen must be recovered from a mixture of gases through a separation process that adds cost and complexity to the reformation process. Steam reformation also leads to the production of the undesirable greenhouse gases $CO_2$ and/or CO as by-products. Water electrolysis has not been widely used in practice because high expenditures of electrical energy are required to effect water electrolysis. The water electrolysis reaction requires a high minimum voltage to initiate and an even higher voltage to achieve practical rates of hydrogen production. The high voltage leads to high electrical energy costs for the water electrolysis reaction and has inhibited its widespread use.

In U.S. Pat. No. 6,607,707 (the '707 patent), the disclosure of which is incorporated by reference herein, the instant inventors considered the production of hydrogen from hydrocarbons and oxygenated hydrocarbons through reactions of hydrocarbons and oxygenated hydrocarbons with a base. Using a thermodynamic analysis, the instant inventors determined that reactions of many hydrocarbons and oxygenated hydrocarbons react spontaneously with a base or basic aqueous solution to form hydrogen gas at particular reaction conditions, while the same hydrocarbons and oxygenated hydrocarbons react non-spontaneously in conventional steam reformation processes at the same reaction conditions. Inclusion of a base was thus shown to facilitate the formation of hydrogen from many hydrocarbons and oxygenated hydrocarbons and enabled the production of hydrogen at less extreme conditions than those normally encountered in steam reformation reactions, thereby improving the cost effectiveness of producing hydrogen gas. In many reactions, the processes of the '707 patent led to the formation of hydrogen gas from a liquid phase reaction mixture, in some cases at room temperature, where hydrogen was the only gaseous product and thus was readily recoverable without the need for a gas phase separation step. The reactions of the '707 patent further operate through the formation of carbonate ion or bicarbonate ion and avoid the production of the greenhouse gases CO and $CO_2$. Inclusion of a base creates a new reaction pathway for the formation of hydrogen gas with thermodynamic benefits that allow for the production of hydrogen gas at lower temperatures than are needed for corresponding steam reformation processes.

In co-pending U.S. patent application Ser. No. 10/321,935 (the "935 application), published as U.S. Pat. Appl. Pub. No. 2003/0089620, the disclosure of which is incorporated by reference herein, the instant inventors considered electrochemical methods to promote the production of hydrogen from organic substances in the presence of water (or acidic solution) and/or a base. They showed that electrochemical reactions of organic substances with water to produce hydrogen require lower electrochemical cell voltages than water electrolysis. They also showed that electrochemical reactions of organic substances in the presence of an acid or base require low electrochemical cell voltages at room temperature.

In co-pending U.S. patent application Ser. No. 10/636,093 (the '093 application), published as U.S. Pat. Appl. Pub. No. 2004/0028603, the disclosure of which is incorporated by reference herein, the instant inventors recognized that the realization of the beneficial properties of the reactions described in the '707 patent and the co-pending '935 application requires a system level consideration of the costs and overall efficiency of the reactions. In addition to energy inputs and raw materials, consideration of the disposal or utilization of by-products must be made. Of particular importance is consideration of the dispensation of the carbonate and bicarbonate ion products of the disclosed hydrogen producing reactions. In the co-pending '093 application, the instant inventors describe strategies for the recycling of the carbonate and bicarbonate ions. A carbonate recycle process was described that includes a first step in which carbonate ion is reacted with a metal hydroxide to form a soluble metal hydroxide and a weakly soluble or insoluble carbonate salt. The soluble metal hydroxide may be returned to the hydrogen producing reaction as a base reactant for further production of hydrogen. In a second step, the carbonate salt is thermally decomposed to produce a metal oxide and carbon dioxide. In a third step, the metal oxide is reacted with water to reform the metal hydroxide used in the first step. The carbonate recycle process is thus sustainable with respect to the metal hydroxide and the overall hydrogen producing process is sustainable with respect to the base through the carbonate recycling process of the '093 application. Bicarbonate by-products of hydrogen producing reactions of organic substances with bases can be similarly recycled according to the '093 application by first converting a bicarbonate by-product to a carbonate and then recycling the carbonate.

In co-pending U.S. patent application Ser. No. 10/763,616 (the '616 application), published as U.S. Pat. Appl. Pub. No. 2004/0156777, and co-pending U.S. patent application Ser. No. 10/966,001 (the '001 application), the disclosures of which are incorporated by reference herein, the instant inventors described an extension of the base-facilitated production of hydrogen from organic substances to a wider range of starting materials. Of particular importance in the '616 application was the production of hydrogen from petroleum-related or petroleum-derived starting materials such as long chain hydrocarbons; fuels such as gasoline, kerosene, diesel, petroleum distillates and components thereof; and mixtures of organic substances. The '001 application considered the production of hydrogen from biomass and naturally occurring organic matter. In U.S. patent application Ser. No. 10/984,202, the disclosure of which is incorporated by reference herein, the instant inventors further considered the production of hydrogen from carbonaceous matter such as coal using a base-facilitated reaction.

The hydrogen producing reactions of the above mentioned patents and applications provide for an efficient, environmentally friendly method for generating the hydrogen needed for the advancement of a hydrogen based economy. There is a need to further extend the range of applicability of the hydrogen producing reactions beyond what was described in the earlier patents and co-pending applications. Of particular interest is consideration of the range of starting materials that may be used in the reactions.

SUMMARY OF THE INVENTION

The instant invention provides a process for producing hydrogen gas from chemical or electrochemical reactions of carbon monoxide or gas mixtures including carbon monoxide with bases. In a preferred embodiment, carbonate and/or bicarbonate compounds are produced as a by-product in the instant reactions. The instant process optionally includes a carbonate or bicarbonate recycle process in which a carbonate or bicarbonate by-product is transformed to a base that can subsequently be further reacted with an organic substance, biomass, carbonaceous matter or mixture thereof to produce hydrogen gas.

The instant base-facilitated hydrogen-producing reactions improve the thermodynamic spontaneity of producing hydrogen gas from carbon monoxide relative to the production of hydrogen gas through the water-gas shift reaction. In one embodiment, the greater thermodynamic spontaneity permits the production of hydrogen gas through the instant base-facilitated reactions of carbon monoxide with a greater equilibrium conversion at a given temperature than is possible from the water-gas shift reaction at the same temperature. In another embodiment, the greater thermodynamic spontaneity permits the production of hydrogen gas from carbon monoxide at a faster rate at a particular temperature in a base-facilitated reaction than in the water-gas shift at the particular temperature.

In one embodiment, the instant base-facilitated hydrogen production reactions are completed through a reaction of carbon monoxide with a solid phase base. In another embodiment, hydrogen is produced in a reaction of carbon monoxide with a molten phase base. In still another embodiment, hydrogen is produced in a reaction of carbon monoxide with an aqueous base or other solution phase base.

DETAILED DESCRIPTION OF THE ILLUSTRATED EMBODIMENTS

Figure 1:
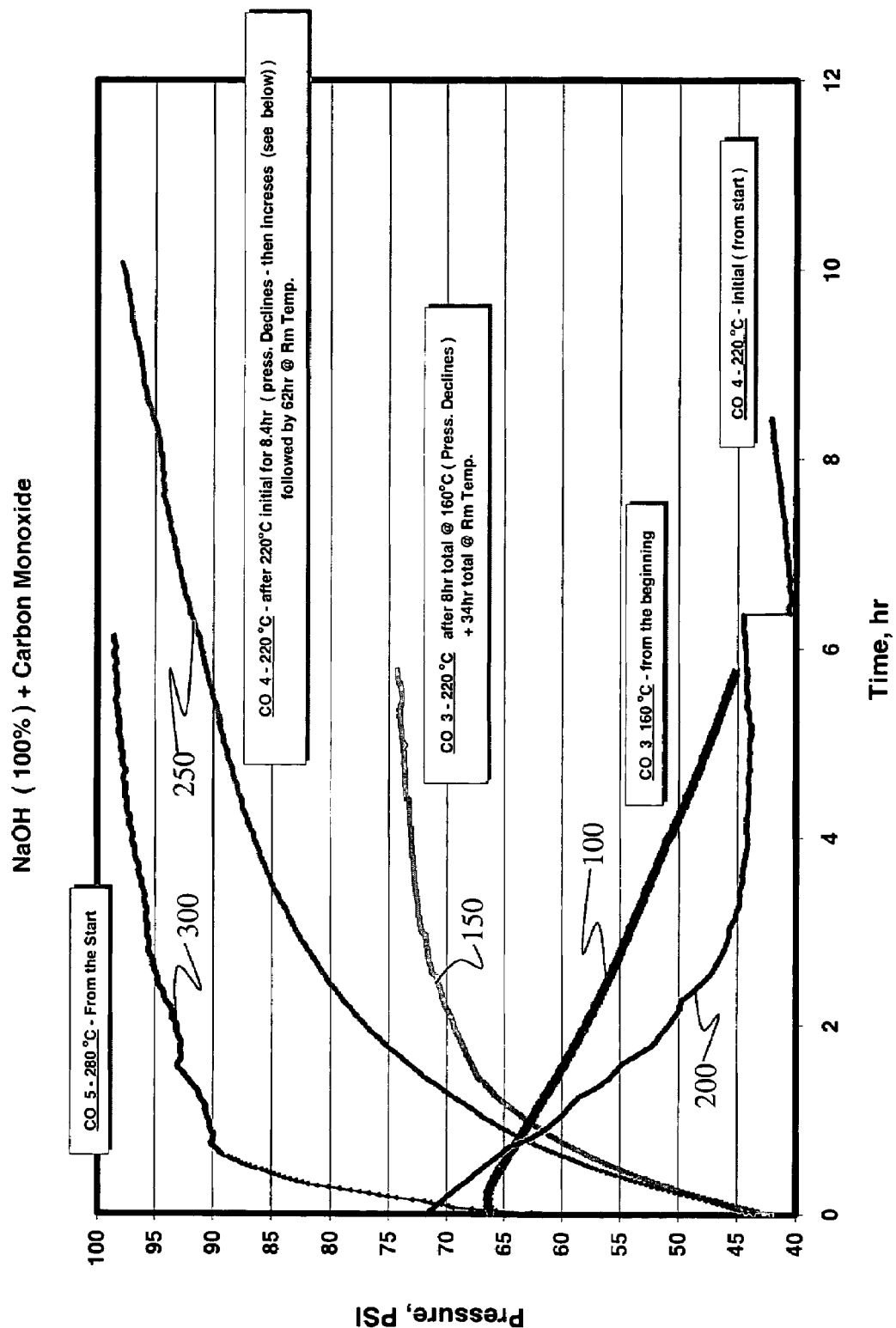
FIG. 1. Variation of the pressure of a reaction vessel initially containing CO and NaOH as a function of time for various heating protocols.

The instant invention is concerned with the production of hydrogen through a chemical or electrochemical reaction of carbon monoxide with a base. The instant reactions may be referred to herein as base-facilitated hydrogen producing reactions, base-facilitated reactions of carbon monoxide, or the like. Related base-facilitated reactions of organic substances, biomass, and carbonaceous matter have been described by the instant inventors in U.S. Pat. No. 6,607,707 (the '707 patent), U.S. patent application Ser. No. 10/321,935 (the '935 application), U.S. patent application Ser. No. 10/763,616 (the '616 application), U.S. patent application Ser. No. 10/966,001 (the '001 application), and U.S. patent application Ser. No. 10/984,202 (the '202 application), the disclosures of which are incorporated by reference herein.

Carbon monoxide is a by-product that is formed in reformation reactions of substances such as methane ($CH_4$), hydrocarbons and coal. These reformation reactions are typically conducted at high temperatures (e.g. 800° C.) in the presence of steam. In a steam reformation process, a carbon-containing feedstock (e.g. hydrocarbon, oxygenated hydrocarbon (e.g. methanol), other organic substance, biomass, carbonaceous matter) is contacted with steam in a high temperature reactor to produce hydrogen gas ($H_2$) along with carbon monoxide (CO). Representative reactions that occur in the steam reformation of methane and coal (represented by carbon (C), the primary constituent) are presented in reactions (1) and (2) below:

$$CH_{4(g)} + H_2O_{(g)} \leftrightarrows 3H_{2(g)} + CO_{(g)} \quad (1)$$

$$C_{(s)} + H_2O_{(g)} \leftrightarrows H_{2(g)} + CO_{(g)} \quad (2)$$

The product mixture of carbon monoxide and hydrogen is often referred to as syngas and can be reacted to form alcohols and higher organics. If the objective is to maximize the production of hydrogen, the product gases can be separated and the carbon monoxide can be further reacted in the water-gas shift reaction (3) shown below:

$$CO_{(g)} + H_2O_{(g)} \leftrightarrows H_{2(g)} + CO_{2(g)} \quad (3)$$

Although the water-gas shift reaction is commonly used to produce hydrogen from carbon monoxide, the reaction suffers from a number of drawbacks. First, in addition to hydrogen, the water-gas shift reaction produces carbon dioxide, a greenhouse gas. Second, the water-gas shift reaction has unfavorable thermodynamics at the elevated temperatures used in the performance of the reforming reaction. In order to realize a reasonable equilibrium constant in the forward direction for the water-gas shift, it is necessary to perform the reaction at temperatures of well below the reformation temperature. (In a typical reformation process, reformation occurs at ~800° C. and it is necessary to run the water-gas shift reaction at temperatures of ~200-400° C., usually in the presence of a catalyst). As a result, the carbon monoxide must be separated from the high temperature reformation reactor and directed to a separate, lower temperature reactor to perform the water-gas shift reaction. This necessity leads to a more costly and more complex process. Third, at the temperatures needed for favorable thermodynamics, the reaction rate is slow and additional costs are incurred due to the need to catalyze the reaction.

In the instant invention, an alternative method for utilizing carbon monoxide in the production of hydrogen is presented. The method is based on the reaction of carbon monoxide with a base. In the instant invention, hydrogen is produced from carbon monoxide in a base-facilitated reaction that proceeds through a carbonate or bicarbonate by-product compound. The instant reaction leads to a more spontaneous (or less non-spontaneous) reaction at a particular set of reaction conditions relative to the water-gas shift reaction.

Reactions of carbon monoxide with a base according to the instant invention are illustrated in reactions (4) and (5) below:

$$CO_{(g)} + 2NaOH_{(s)} \leftrightarrows Na_2CO_{3(s)} + H_{2(g)} \quad (4)$$

$$CO_{(g)} + NaOH_{(s)} + H_2O_{(g)} \leftrightarrows NaHCO_{3(s)} + H_{2(g)} \quad (5)$$

In reactions (4) and (5), carbon monoxide is reacted with the base sodium hydroxide to form hydrogen case. The reactions can be performed, for example, by passing or blowing a stream of carbon monoxide (or a mixture of gases that includes carbon monoxide) over a solid phase base. The solid phase base can be in the form of pellets or further ground to create a higher surface area to promote faster reaction. Reactions (4) and (5) differ with respect to the relative amounts of base used in the reaction. Reaction (4) includes a greater amount of base and proceeds by forming sodium carbonate ($Na_2CO_3$) as a carbonate by-product, while reaction (5) includes a lesser amount of base and proceeds by forming sodium bicarbonate ($NaHCO_3$) as a bicarbonate by-product. When producing hydrogen according to the instant invention, both the carbonate by-product reaction and the bicarbonate by-product reaction can occur simultaneously. The relative competitiveness of the two reactions can be controlled through reaction conditions such as the ratio of base to carbon monoxide or reaction temperature. The higher the ratio of base to carbon monoxide is, the more competitive reaction (4) becomes in relative terms. Similarly, the lower the ratio of base to carbon monoxide is, the more competitive reaction (5) becomes in relative terms.

A thermodynamic analysis can be used to demonstrate the advantage of base-facilitated reactions (4) and (5) relative to the water-gas shift reaction (3) for the production of hydrogen gas. Below we present the values of the Gibbs energy of reaction ($\Delta G^0_{rxn}$) and the enthalpy of reaction ($\Delta H^0_{rxn}$) for reactions (3), (4), and (5) at standard conditions (25° C., 1 atm. and unit activity of reactants and products):

| | | $\Delta G^0_{rxn}$ (kcal/mol) | $\Delta H^0_{rxn}$ (kcal/mol) |
|---|---|---|---|
| (3) | $CO_{(g)} + H_2O_{(g)} \leftrightarrows H_{2(g)} + CO_{2(g)}$ | −6.8 | −9.9 |
| (4) | $CO_{(g)} + 2NaOH_{(s)} \leftrightarrows Na_2CO_{3(s)} + H_{2(g)}$ | −35.5 | −40.5 |
| (5) | $CO_{(g)} + NaOH_{(s)} + H_2O_{(g)} \leftrightarrows NaHCO_{3(s)} + H_{2(g)}$ | −25.0 | −37.0 |

The Gibbs free energy is an indicator of the thermodynamic spontaneity of a chemical reaction. Spontaneous reactions have negative values for the Gibbs free energy, while non-spontaneous reactions have positive values for the Gibbs free energy. Reaction conditions such as reaction temperature, reaction pressure, concentration etc. may influence the value of the Gibbs free energy. A reaction that is non-spontaneous at one set of conditions may become spontaneous at another set of conditions. The magnitude of the Gibbs free energy is an indicator of the degree of spontaneity of a reaction. The more negative (or less positive) the Gibbs free energy is, the more spontaneous is the reaction.

The water-gas shift reaction (3) above is slightly spontaneous and slightly exothermic at standard conditions. The rate of the water-gas shift reaction (3), however, at standard conditions is very slow and elevated temperatures are needed to obtain practical reaction rates. As described hereinabove, however, as the temperature of the water-gas shift reaction increases, the thermodynamic spontaneity becomes unfavorable and, in fact, the reaction runs preferentially in the reverse direction. In practice, the water-gas shift reaction is run at about 200° C. to optimize the reaction rate while maintaining thermodynamic spontaneity. Even when optimized, however, the reaction rate is slower than desired for many practical purposes.

The base-facilitated reactions (4) and (5) show greater thermodynamic spontaneity and greater exothermicity at standard conditions than the water-gas shift reaction (3). As a result, the base-facilitated reactions (4) and (5) are expected to remain spontaneous over a wider temperature range and to provide greater rates of production than the water-gas shift reaction (3).

The instant inventors note that the actual ratio of base to carbon monoxide is not constrained by the stoichiometric ratios indicated in reactions (4) and (5). The production of hydrogen according to the instant invention occurs for arbitrary ratios of base to carbon monoxide and can occur through reaction (4), reaction (5) or through a combination of reactions (4) and (5) under a given set of reaction conditions and reactant amounts. It is further within the scope of the instant invention to produce hydrogen through reaction (4), reaction (5) or a combination thereof in the presence of water where reaction (3) occurs simultaneously. Hydrogen gas can be produced via the instant invention along with the production of a carbonate by-product, bicarbonate by-product or a combination of a carbonate and bicarbonate by-product. Carbon dioxide may also optionally be formed as an additional by-product.

Reactions (7)-(10) show representative reactions in which hydrogen is produced from a reaction of carbon monoxide, sodium hydroxide and water. Sodium carbonate and carbon dioxide are produced as by-products. In these reactions, the ratio of water to sodium hydroxide is varied.

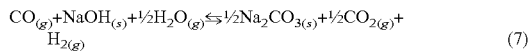
$$CO_{(g)} + NaOH_{(s)} + \tfrac{1}{2}H_2O_{(g)} \rightleftharpoons \tfrac{1}{2}Na_2CO_{3(s)} + \tfrac{1}{2}CO_{2(g)} + H_{2(g)} \quad (7)$$

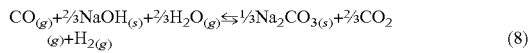
$$CO_{(g)} + \tfrac{2}{3}NaOH_{(s)} + \tfrac{2}{3}H_2O_{(g)} \rightleftharpoons \tfrac{1}{3}Na_2CO_{3(s)} + \tfrac{2}{3}CO_{2(g)} + H_{2(g)} \quad (8)$$

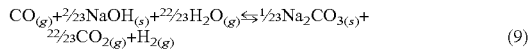
$$CO_{(g)} + \tfrac{2}{23}NaOH_{(s)} + \tfrac{22}{23}H_2O_{(g)} \rightleftharpoons \tfrac{1}{23}Na_2CO_{3(s)} + \tfrac{22}{23}CO_{2(g)} + H_{2(g)} \quad (9)$$

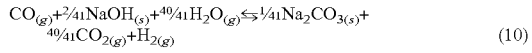
$$CO_{(g)} + \tfrac{2}{41}NaOH_{(s)} + \tfrac{40}{41}H_2O_{(g)} \rightleftharpoons \tfrac{1}{41}Na_2CO_{3(s)} + \tfrac{40}{41}CO_{2(g)} + H_{2(g)} \quad (10)$$

Thermodynamic quantities at standard conditions for reactions (7)-(10) are given below.

| Reaction | $\Delta G^0_{rxn}$ (kcal/mol) | $\Delta H^0_{rxn}$ (kcal/mol) | Ratio $H_2O/NaOH$ |
|---|---|---|---|
| (7) | −21.2 | −25.2 | 0.5 |
| (8) | −16.4 | −20.1 | 1 |
| (9) | −8.0 | −11.2 | 11 |
| (10) | −7.5 | −10.6 | 20 |

The thermodynamic results indicate that the hydrogen producing reactions (7)-(10) are most spontaneous when the water:base ratio is low, but remain spontaneous even for large water:base ratios. The production of hydrogen from carbon monoxide and a base therefore remains favorable even in the presence of significant amounts of water. The production of hydrogen is also favorable with the production of carbon dioxide as a by-product. Such embodiments are within the scope of the instant invention.

Reactions (11)-(14) show representative reactions in which hydrogen is produced from a reaction of carbon monoxide, sodium hydroxide and water. Sodium bicarbonate and carbon dioxide are produced as by-products. In these reactions, the ratio of water to sodium hydroxide is varied.

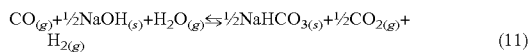
$$CO_{(g)} + \tfrac{1}{2}NaOH_{(s)} + H_2O_{(g)} \rightleftharpoons \tfrac{1}{2}NaHCO_{3(s)} + \tfrac{1}{2}CO_{2(g)} + H_{2(g)} \quad (11)$$

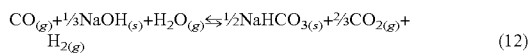
$$CO_{(g)} + \tfrac{1}{3}NaOH_{(s)} + H_2O_{(g)} \rightleftharpoons \tfrac{1}{3}NaHCO_{3(s)} + \tfrac{2}{3}CO_{2(g)} + H_{2(g)} \quad (12)$$

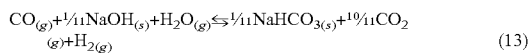
$$CO_{(g)} + \tfrac{1}{11}NaOH_{(s)} + H_2O_{(g)} \rightleftharpoons \tfrac{1}{11}NaHCO_{3(s)} + \tfrac{10}{11}CO_{2(g)} + H_{2(g)} \quad (13)$$

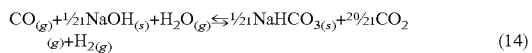
$$CO_{(g)} + \tfrac{1}{21}NaOH_{(s)} + H_2O_{(g)} \rightleftharpoons \tfrac{1}{21}NaHCO_{3(s)} + \tfrac{20}{21}CO_{2(g)} + H_{2(g)} \quad (14)$$

Thermodynamic quantities at standard conditions for reactions (11)-(14) are given below.

| Reaction | $\Delta G^0_{rxn}$ (kcal/mol) | $\Delta H^0_{rxn}$ (kcal/mol) | Ratio $H_2O/NaOH$ |
|---|---|---|---|
| (11) | −15.9 | −20.5 | 2 |
| (12) | −12.9 | −18.9 | 3 |
| (13) | −8.5 | −12.4 | 11 |
| (14) | −7.7 | −11.2 | 21 |

The thermodynamic results indicate that the hydrogen producing reactions (11)-(14) are most spontaneous when the water:base ratio is low, but remain spontaneous even for large water:base ratios. The production of hydrogen from carbon monoxide and a base therefore remains favorable even in the presence of significant amounts of water. The production of hydrogen is also favorable with the production of carbon dioxide as a by-product. Such embodiments are within the scope of the instant invention.

Reactions (15)-(18) show representative reactions in which hydrogen is produced from a reaction of carbon monoxide, sodium hydroxide and water. Sodium carbonate, sodium bicarbonate and carbon dioxide are produced as by-products. In these reactions, the ratio of water to sodium hydroxide is varied.

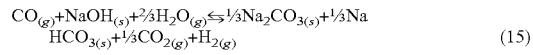
$$CO_{(g)} + NaOH_{(s)} + \tfrac{2}{3}H_2O_{(g)} \rightleftharpoons \tfrac{1}{3}Na_2CO_{3(s)} + \tfrac{1}{3}NaHCO_{3(s)} + \tfrac{1}{3}CO_{2(g)} + H_{2(g)} \quad (15)$$

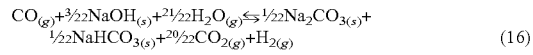
$$CO_{(g)} + \tfrac{3}{22}NaOH_{(s)} + \tfrac{21}{22}H_2O_{(g)} \rightleftharpoons \tfrac{1}{22}Na_2CO_{3(s)} + \tfrac{1}{22}NaHCO_{3(s)} + \tfrac{20}{22}CO_{2(g)} + H_{2(g)} \quad (16)$$

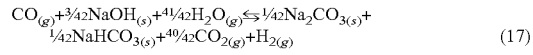
$$CO_{(g)} + \tfrac{3}{42}NaOH_{(s)} + \tfrac{41}{42}H_2O_{(g)} \rightleftharpoons \tfrac{1}{42}Na_2CO_{3(s)} + \tfrac{1}{42}NaHCO_{3(s)} + \tfrac{40}{42}CO_{2(g)} + H_{2(g)} \quad (17)$$

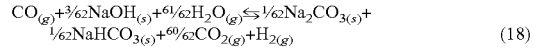
$$CO_{(g)} + \tfrac{3}{62}NaOH_{(s)} + \tfrac{61}{62}H_2O_{(g)} \rightleftharpoons \tfrac{1}{62}Na_2CO_{3(s)} + \tfrac{1}{62}NaHCO_{3(s)} + \tfrac{60}{62}CO_{2(g)} + H_{2(g)} \quad (18)$$

Thermodynamic quantities at standard conditions for reactions (15)-(18) are given below.

| Reaction | $\Delta G^0_{rxn}$ (kcal/mol) | $\Delta H^0_{rxn}$ (kcal/mol) | Ratio $H_2O/NaOH$ |
|---|---|---|---|
| (15) | −22.4 | −29.1 | 0.7 |
| (16) | −8.9 | −12.5 | 7 |
| (17) | −7.9 | −11.3 | 14 |
| (18) | −7.6 | −10.8 | 20 |

The thermodynamic results indicate that the hydrogen producing reactions (15)-(18) are most spontaneous when the water:base ratio is low, but remain spontaneous even for large water:base ratios. The production of hydrogen from carbon monoxide and a base therefore remains favorable even in the presence of significant amounts of water. The production of hydrogen is also favorable with the production of carbon dioxide as a by-product. Such embodiments are within the scope of the instant invention.

Representative experiments demonstrating the production of hydrogen through a reaction of carbon monoxide and sodium hydroxide are presented in the examples that follow.

Example 1

In this example, the production of hydrogen from a reaction of carbon monoxide and a base is demonstrated. More specifically, hydrogen was produced from a reaction of carbon monoxide (CO) and sodium hydroxide (NaOH). Solid phase NaOH (which is hygroscopic and included ~10% adsorbed water) was used in this experiment.

About 7 g of the NaOH was placed into a stainless steel reaction vessel having a total volume of ~40 mL. The reaction vessel was evacuated, flushed multiple times with CO to eliminate air from the reaction environment, and filled with CO to a pressure of 60 psi. The vessel was then sealed. The temperature of the vessel was raised to 160° C. and held at that temperature for 8 hours. The vessel was then cooled to room temperature, allowed to stand for 34 hours, subsequently heated to 220° C. for 8 hours and cooled once again to room temperature to conclude the experiment.

Samples of the gas phase were periodically extracted from the reaction vessel at various stages during the reaction and were analyzed using gas chromatography to determine the relative presence of $O_2$, $N_2$, and $H_2$ in the gas phase. The gas chromatograph was not configured to detect CO in this experiment. The gas phase compositional percentages reported in this example refer to percentages exclusive of CO and correspond to the composition of the primary non-CO components of the gas phase. After the reaction vessel had been flushed and filled with CO, and before the initial heating step, a sample of the gas phase was extracted for gas chromatographic analysis to determine the non-CO composition. The gas chromatography analysis showed the presence of residual amounts of $O_2$ and $N_2$ (in a 17%:83% ratio) and no detectable amount of $H_2$.

The pressure of the reaction vessel was monitored as a function of time during the experiment and the results are shown as curves 100 and 150 in FIG. 1. Curve 100 depicts the variation of the pressure at 160° C. during the first six hours of the experiment and illustrates the pressure decrease that was observed during this period of time. A sample of the gas phase was obtained after 6 hours at 160° C. and indicated that the composition of the non-CO portion of the gas phase continued to be approximately 17% $O_2$ and 83% $N_2$.

Curve 150 depicts the variation in pressure of the reaction vessel beginning at the time at which the vessel was heated to 220° C. As described above, prior to heating at 220° C., the reaction vessel had been heated at 160° C. for 8 hours and then left to stand at room temperature for 34 hours. Curve 150 shows the rapid increase in pressure that was observed upon heating at 220° C. The pressure increased to over 70 psi and was observed to level off. After 6 hours of heating at 220° C., a sample of the gas phase was extracted and analyzed with gas chromatography. The chromatographic analysis showed that the non-CO portion of the gas phase included approximately 99% $H_2$, with the combined amounts of $O_2$ and $N_2$ totaling about 1%. The analysis thus indicates that the substantial increase in pressure observed upon heating at 220° C. was due primarily to the formation of hydrogen in the reaction vessel. After 8 hours of heating at 220° C., the reaction vessel was allowed to cool to room temperature. An analysis of the non-CO portion of the gas phase upon return to room temperature indicated that the gas phase composition was maintained at approximately 99% $H_2$ and a combined 1% for $O_2$ and $N_2$.

This experiment demonstrates the production of $H_2$ from a reaction of CO and a base.

Example 2

In this example, the production of hydrogen from a reaction of carbon monoxide and a base is further demonstrated. More specifically, hydrogen was produced from a reaction of carbon monoxide (CO) and sodium hydroxide (NaOH). The reaction vessel, solid phase NaOH and CO are as described in EXAMPLE 1 hereinabove.

About 7 g of the NaOH was placed into a stainless steel reaction vessel having a total volume of ~40 mL. The reaction vessel was evacuated, flushed multiple times with CO to eliminate air from the reaction environment, and filled with CO to a pressure of 65 psi. The vessel was then sealed. The temperature of the vessel was raised to 220° C. and held at that temperature for over 8 hours. The vessel was then cooled to room temperature, allowed to stand for 62 hours, subsequently heated back to 220° C. for 10 hours and cooled once again to room temperature to conclude the experiment. Samples of the gas phase were periodically extracted from the reaction vessel at various stages during the reaction and were analyzed using gas chromatography to determine the relative presence of $O_2$, $N_2$, and $H_2$ in the gas phase as described in EXAMPLE 1 hereinabove.

The pressure of the reaction vessel was monitored as a function of time during the experiment and the results are shown as curves 200 and 250 in FIG. 1. Curve 200 depicts the variation of the pressure at 220° C. during the initial stage of the experiment and illustrates the pressure decrease that was observed during this period of time. A sample of the gas phase was extracted after the reactor had been heated for slightly more than 6 hours. (The time corresponds to the drop off in pressure from about 44 psi to about 41 psi shown in curve 200.) A chromatographic analysis of the sample showed that the non-CO portion of the gas phase included approximately 98.5% $H_2$, with the combined amounts of $O_2$ and $N_2$ totaling about 1.5%.

Curve 250 depicts the variation in pressure of the reaction vessel beginning at the time at which the vessel was reheated back to 220° C. As described above, prior to the reheating back to 220° C., the reaction vessel had been heated once at 220° C. for over 8 hours and then left to stand at room temperature for 62 hours. Curve 250 shows the rapid increase in pressure that was observed upon heating the reaction vessel back to 220° C. The pressure increased to over 95 psi after about 10 hours, after which time the reaction vessel was permitted to cool down to room temperature, at which point the pressure returned to ~80 psi, and another sample of the gas phase was extracted for chromatographic analysis. The analysis indicated that the composition of the non-CO portion of the gas phase included approximately 99.8% $H_2$ and a combined 0.2% for $O_2$ and $N_2$.

This experiment demonstrates the production of $H_2$ from a reaction of CO and a base.

Example 3

In this example, the production of hydrogen from a reaction of carbon monoxide and a base is further demonstrated. More specifically, hydrogen was produced from a reaction of carbon monoxide (CO) and sodium hydroxide (NaOH). The reaction vessel, solid phase NaOH and CO are as described in EXAMPLE 1 hereinabove.

About 7 g of the NaOH was placed into a stainless steel reaction vessel having a total volume of ~40 mL. The reaction vessel was evacuated, flushed multiple times with CO to eliminate air from the reaction environment, and filled with CO to a pressure of 60 psi. The vessel was then sealed. The temperature of the vessel was raised to 280° C. and held at that temperature for over 6 hours. The vessel was then cooled to room temperature to conclude the experiment.

Samples of the gas phase were periodically extracted from the reaction vessel at various stages during the reaction and were analyzed using gas chromatography to determine the relative presence of $O_2$, $N_2$, and $H_2$ in the gas phase as described in EXAMPLE 1 hereinabove. After the reaction vessel had been flushed and filled with CO, and before the initial heating step, a sample of the gas phase was extracted for gas chromatographic analysis to determine the non-CO composition. The gas chromatography analysis showed the presence of residual amounts of $O_2$ and $N_2$ (in a 17%:83% ratio) and no detectable amount of $H_2$.

The pressure of the reaction vessel was monitored as a function of time during the experiment and the result is shown as curve 300 in FIG. 1. Curve 300 depicts the variation of the pressure at 280° C. during the heating stage of the experiment and illustrates the pressure increase that was observed during this stage. In contrast to the experiments described in EXAMPLES 1 and 2 hereinabove, an initial time period over which a pressure decrease occurred was not observed. Instead, the reactor pressure increased rapidly in the first hour of heating and ultimately began to level off, reaching a pressure of almost 99 psi after about 6 hours of heating at 280° C.

The reaction vessel was allowed to cool for 16 hours and during this time period, the reactor returned to room temperature and the pressure returned to ~75 psi. A sample of the gas phase was extracted for gas chromatographic analysis as described in EXAMPLE 1 hereinabove. The chromatographic analysis showed that the non-CO portion of the gas phase included approximately 99.4% $H_2$, with the combined amounts of $O_2$ and $N_2$ totaling about 0.6%. The reaction vessel was left sealed for another 47 hours at room temperature and another gas chromatographic analysis of the non-CO portion of the gas phase was completed. The results of this analysis indicated that the gas phase composition included 99.2% $H_2$ and a combined 0.8% for $O_2$ and $N_2$.

This experiment demonstrates the production of $H_2$ from a reaction of CO and a base.

The carbon monoxide utilized in the instant base-facilitated reactions can be in a purified or unpurified form and may be a single component or one of a mixture of components placed into contact with the solid phase base. A gas phase mixture such as syngas, for example, produced during the reformation of organic substances can be directly reacted with a base according to the instant invention to produce hydrogen. Other gas phase mixtures the include carbon monoxide in combination with one or more of hydrogen, carbon dioxide, air, oxygen, nitrogen or water vapor are suitable reactant feedstocks for the production of hydrogen within the scope of the instant invention.

The illustrative embodiments of the instant base-facilitated reactions described hereinabove are representative of reactions according to the instant invention that proceed through a reaction of carbon monoxide with a solid phase form of the base. The instant invention also includes embodiments in which the base is in a molten phase. These embodiments occur, for example, at elevated operating temperatures of the instant invention where a solid phase base is reacted at a temperature above its melting point. Elevated temperatures may be desirable for enhancing the kinetics of the reaction so that hydrogen is produced at a faster rate.

The instant invention further includes embodiments in which a liquid phase base is utilized in the instant reaction. In these embodiments, carbon monoxide gas can be bubbled through, dissolved in or otherwise contacted with an aqueous or liquid phase base or base solution to effect the production of hydrogen. As a representative embodiment, a 3-phase reaction (solid/liquid/gas), such as occurs in a fuel cell electrode, can be identified. Selected examples of the instant invention that produce hydrogen from a reaction of carbon monoxide with an aqueous phase base along with pertinent thermodynamic quantities at standard conditions are shown as reactions (19) and (20) below:

|      |                                                                                  | $\Delta G^0_{rxn}$ (kcal/mol) | $\Delta H^0_{rxn}$ (kcal/mol) |
|------|----------------------------------------------------------------------------------|-------------------------------|-------------------------------|
| (19) | $CO_{(g)} + 2NaOH_{(aq)} \rightleftarrows Na_2CO_{3(aq)} + H_{2(g)}$             | −18.4                         | −26.22                        |
| (20) | $CO_{(g)} + NaOH_{(aq)} + H_2O_{(l)} \rightleftarrows NaHCO_{3(aq)} + H_{2(g)}$  | −13.4                         | −16.1                         |

The thermodynamic parameters of reactions (19) and (20) indicate that both reactions are spontaneous and exothermic at standard conditions. Consequently, both reactions are expected to produce hydrogen efficiently at practical reaction conditions. Analogous to what was described hereinabove, these reactions may also be completed in the presence of additional water and/or with the production of carbon dioxide as a by-product.

Metal hydroxides are the preferred bases in the instant reactions. Representative metal hydroxides include alkali metal hydroxides (e.g. NaOH, KOH etc.) alkaline earth metal hydroxides (e.g. $Ca(OH)_2$, $Mg(OH)_2$, etc.), transition metal hydroxides, post-transition metal hydroxides and rare earth hydroxides. Non-metal hydroxides such as ammonium hydroxide may also be used. At standard state conditions, most hydroxide compounds are solids. As described hereinabove, the bases can be introduced in solid, liquid, dissolved, solvated or solution form as reactants in the instant base-facilitated hydrogen-producing reactions. Aqueous solutions are one preferred solution form of hydroxide compounds. Suitable metal hydroxide bases include those that are pure or impure as well as those that include adsorbed water or waters of hydration.

The carbonate and bicarbonate by-products of the instant reaction are preferably produced in the form of solids in a reaction of gas phase carbon monoxide with a solid phase base. In liquid phase embodiments in which carbon monoxide may be bubbled through or dissolved in water or other liquid or solvent, the carbonate and bicarbonate by-products is produced in the form of solid phase precipitates or as soluble or partially soluble compounds.

In a further embodiment of the instant invention, the instant base-facilitated reactions are conducted electrochemically to produce hydrogen from carbon monoxide. As described in the parent '935 application, inclusion of a base in a hydrogen-producing reaction reduces the electrochemical potential (voltage) required to effect the production of hydrogen from substances relative to the corresponding electrochemical reaction in the absence of a base. The instant invention further includes electrochemical reactions in accordance with the parent '935 application as applied to the production of hydrogen from carbon monoxide. In these embodiments, carbon monoxide may be bubbled through or dissolved in an aqueous or other electrolytic solution and placed in an electrochemical cell having an anode and a cathode. A voltage is applied between the anode and cathode to effect the electrolytic production of hydrogen from dissolved carbon monoxide in an electrochemical reaction in accordance with the '935 application. In a representative embodiment, carbon monoxide is dissolved in an electrolyte, such as an aqueous electrolyte, which is combined with a solid, liquid or dissolved base in an electrochemical cell to form an electrochemical system. An anode and cathode are placed into contact with the electrochemical system and the electrochemical reaction is performed by applying a voltage or passing a current between the anode and cathode to produce hydrogen. Carbon monoxide reacts at the anode and hydrogen is produced at the cathode. A fuel cell type 3-phase (solid/liquid/gas) electrode may be used as an electrode.

In yet another embodiment of the instant invention, the instant base-facilitated reactions are conducted in combination with the carbonate or bicarbonate recovery reactions discussed in the co-pending parent '093 application. The carbonate or bicarbonate recovery reactions are intended to improve the overall efficiency of the hydrogen-producing reactions that form carbonate or bicarbonate by-products. Carbonate and bicarbonate compounds are by-products that need to be sold as a commodity, utilized, discarded or otherwise dispensed with. In order to improve the efficiency of hydrogen production, it is desirable to recycle or otherwise utilize the carbonate or bicarbonate compound by-product.

The '093 application discusses recovery reactions that may be used to recycle carbonate or bicarbonate by-products. Various reactions are discussed depending on the form of the carbonate or bicarbonate by-product formed in the instant base-facilitated reaction. As an example, if a carbonate by-product is formed as a metal carbonate precipitate, this precipitate can be collected and thermally decomposed to obtain a metal oxide. This metal oxide can subsequently be reacted with water to form a metal hydroxide that can be returned as a base reactant to the instant base-facilitated reaction or reacted with, for example, $Ca(OH)_2$ to obtain NaOH and $CaCO_3$. As another example, if a carbonate by-product is formed as a metal carbonate that is soluble in the reaction mixture, further reaction with a metal hydroxide may occur where the metal hydroxide is selected so that the carbonate salt of its metal has a low solubility (low $K_{sp}$) so that a metathesis reaction occurs to precipitate out a metal carbonate while leaving behind a soluble metal hydroxide that can be used as a base reactant in further runs of the instant base-facilitated reactions. Bicarbonate by-products may be similarly re-utilized. The method of producing hydrogen gas through the instant base-facilitated reformation reactions may thus optionally include additional steps directed at the recycling, conversion or re-utilization of carbonate or bicarbonate by-products in accordance with the '093 application.

The hydrogen production reactions of the instant invention may also be conducted in the presence of catalysts such as carbon, carbon black, graphite, transition metals or transition metal complexes. Heterogeneous and homogeneous catalysts are within the scope of the instant invention.

In a further embodiment of the instant invention, the hydrogen producing reaction is performed in a process that includes as an additional step the reformation of a hydrocarbon. In this embodiment, a hydrocarbon, oxygenated hydrocarbon or mixed feedstock is supplied to a reformation reactor to undergo a reformation reaction. In the reformation reaction, a hydrocarbon or oxygenated hydrocarbon reacts with steam at an elevated temperature to produce hydrogen, carbon monoxide and carbon dioxide. Representative reformation reactions can be written as follows:

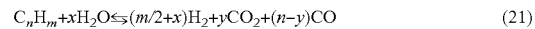

$$C_nH_m + xH_2O \leftrightharpoons (m/2+x)H_2 + yCO_2 + (n-y)CO \qquad (21)$$

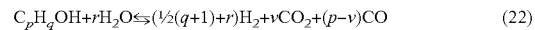

$$C_pH_qOH + rH_2O \leftrightharpoons (\tfrac{1}{2}(q+1)+r)H_2 + vCO_2 + (p-v)CO \qquad (22)$$

where reaction (21) shows the reformation reaction of an arbitrary hydrocarbon and reaction (22) shows the reformation reaction of an arbitrary alcohol, a representative oxygenated hydrocarbon. The feedstock in a reformation reaction can further include a mixture of hydrocarbons, a mixture of oxygenated hydrocarbons, or a mixture of hydrocarbons and oxygenated hydrocarbons.

In this embodiment, the carbon monoxide (in separated form or in combination with the other gas phase reformation products) is directed toward a reactor and reacted with a base according to the instant reaction to produce additional hydrogen. In this embodiment, the instant base-facilitated reaction of carbon monoxide replaces the water-gas shift reaction currently employed in the standard reformation process. In contrast to the water-gas shift reaction, the instant reaction proceeds at appreciable rates at and near the temperature of reformation so that it is not necessary to lower the temperature by several hundred degrees as is currently required in the water-gas shift reaction to produce hydrogen from the carbon monoxide by-product of the reformation reaction. In a preferred embodiment, hydrogen is produced from the carbon monoxide by-product of a reformation reaction according to the instant reaction at a temperature within 200° C. of the reformation reaction temperature. In a more preferred embodiment, hydrogen is produced from the carbon monoxide by-product of a reformation reaction according to the instant reaction at a temperature within 100° C. of the reformation reaction temperature. The advantage of the instant reaction in the reformation process is that the carbon monoxide by product of the reformation reaction can be reacted to form hydrogen within the reformation reactor or in a reaction vessel directly connected to the reformation reactor without the need for separating the gas phase products and cooling them prior to reaction as is currently necessary for the water-gas shift reaction. The instant reaction can occur in the presence of any unreacted or incompletely reacted water, hydrocarbon or oxygenated hydrocarbon that remains after the reformation reaction.

The foregoing discussion and description are not meant to be limitations upon the practice of the present invention, but rather illustrative thereof. It is to be appreciated by persons of skill in the art that numerous equivalents of the illustrative embodiments disclosed herein exist. It is the following claims, including all equivalents and obvious variations thereof, in combination with the foregoing disclosure which define the scope of the invention.

We claim:

1. A process for producing hydrogen gas comprising the step of reacting carbon monoxide with a base;
    wherein said reaction step includes an electrochemical reaction, said electrochemical reaction occurring in an electrochemical cell into which said carbon monoxide, said base and an electrolyte are placed to form an electrochemical reaction system, carbon monoxide being dissolved in said electrolyte, said electrochemical cell including an anode and cathode in contact with said electrochemical system, said electrochemical reaction being initiated upon applying a voltage between said anode and said cathode.

2. The process of claim 1, wherein said carbon monoxide is in an unpurified state.

3. The process of claim 1, wherein said carbon monoxide is a component within a mixture of gases.

4. The process of claim 3, wherein said mixture of gases further includes carbon dioxide.

5. The process of claim 3, wherein said mixture of gases includes syngas.

6. The process of claim 1, wherein said carbon monoxide and said base are reacted in the presence of water.

7. The process of claim 6, wherein said water is in the form of water vapor.

8. The process of claim 1, wherein said reaction step occurs in the absence of liquid phase water.

9. The process of claim 1, wherein said base is a solid phase base.

10. The process of claim 1, wherein said base is a molten phase base.

11. The process of claim 1, wherein said base is a liquid phase base.

12. The process of claim 1, wherein said base is an aqueous base.

13. The process of claim 1, wherein said base is a metal hydroxide compound.

14. The process of claim 13, wherein said metal hydroxide compound is an alkali metal hydroxide compound.

15. The process of claim 13, wherein said metal hydroxide compound is an alkaline earth metal hydroxide compound.

16. The process of claim 1, wherein said reaction step further forms a carbonate or bicarbonate compound.

17. The process of claim 16, further including the step of reacting said carbonate or bicarbonate compound with a metal hydroxide compound.

18. The process of claim 16, wherein said carbonate or bicarbonate compound is formed as a solid phase compound.

19. The process of claim 18, further including the step of thermally decomposing said carbonate or bicarbonate solid phase compound.

20. The process of claim 16, wherein said carbonate or bicarbonate compound is in the form of a dissolved compound.

21. The process of claim 1, wherein said reaction step further forms carbon dioxide.

22. The process of claim 1, wherein said reaction step occurs in the presence of a catalyst.

* * * * *